(No Model.)
W. E. PUFFER.
AUTOMATIC REGULATOR FOR FURNACES.
No. 265,633. Patented Oct. 10, 1882.
2 Sheets—Sheet 1.
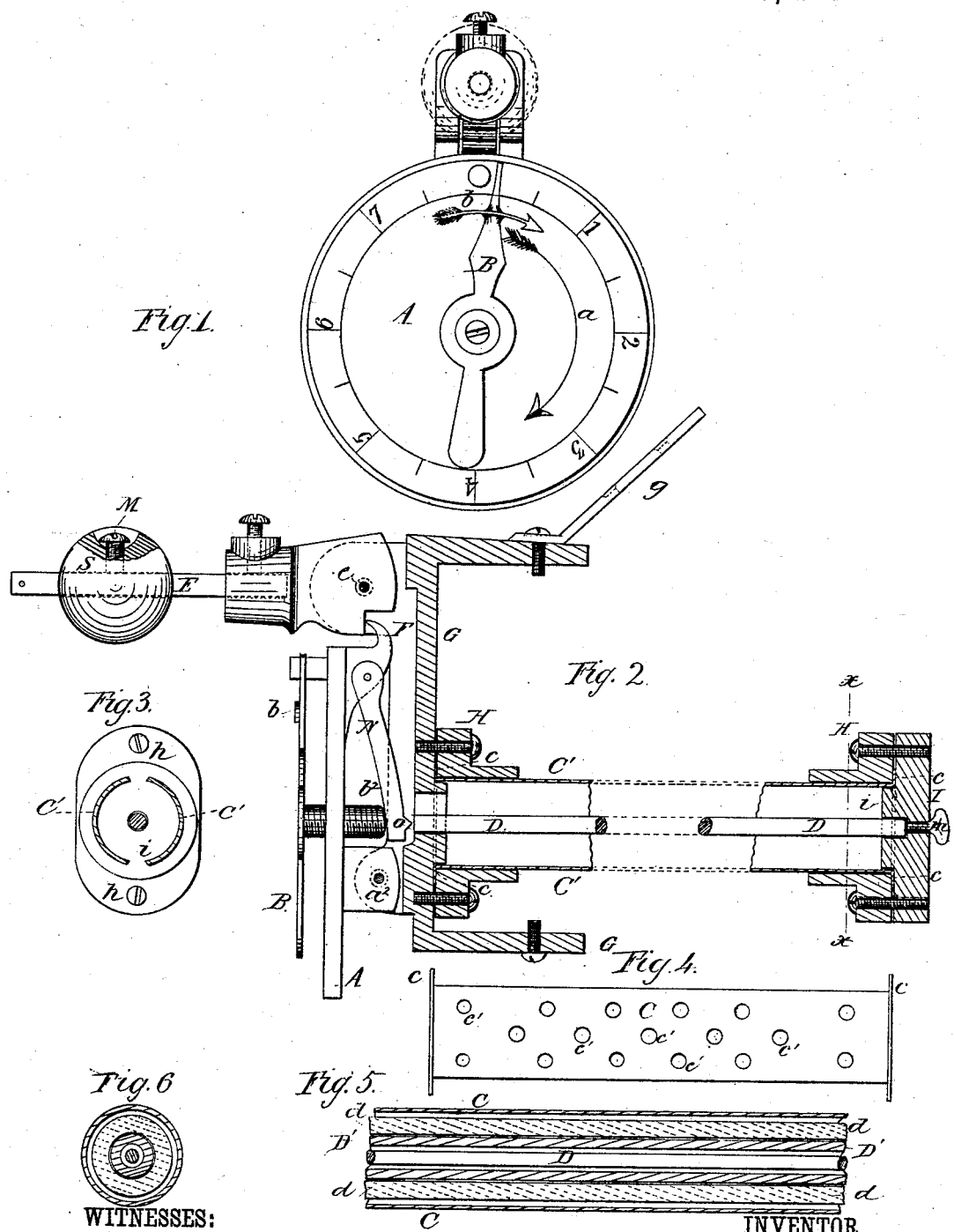
WITNESSES:
INVENTOR
William E. Puffer,
BY Wm. M. Cuthbert,
ATTORNEY (No Model.) 2 Sheets—Sheet 2.
W. E. PUFFER.
AUTOMATIC REGULATOR FOR FURNACES.
No. 265,633. Patented Oct. 10, 1882.
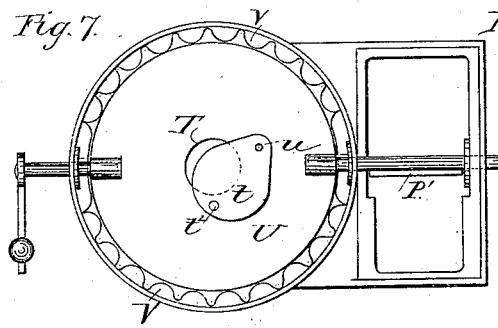
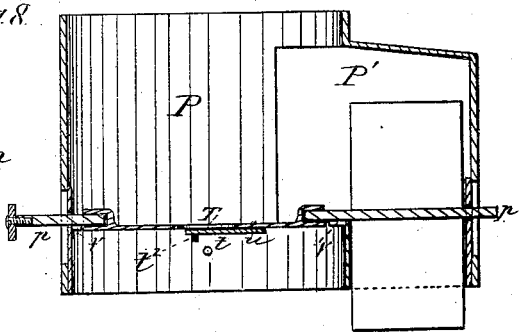
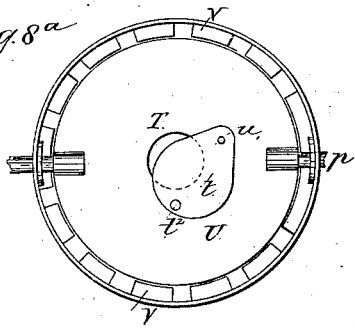
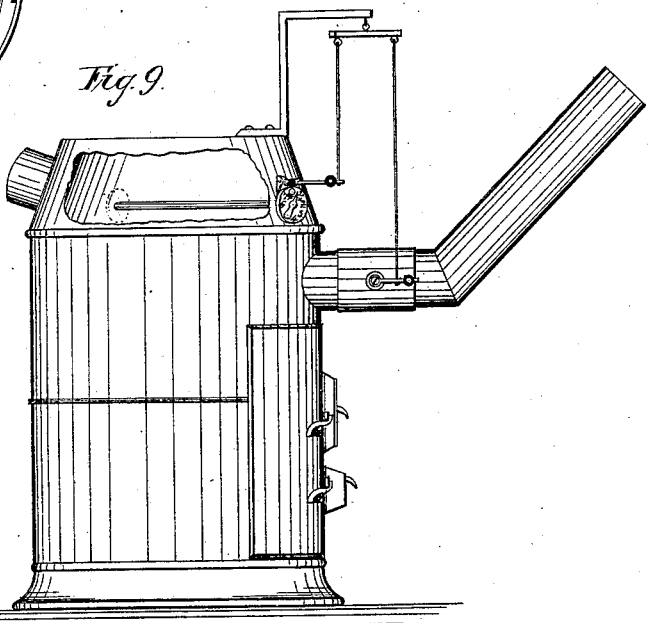
WITNESSES:
INVENTOR
William E. Puffer,
BY Wm. M. Cuthbert
ATTORNEY

UNITED STATES PATENT OFFICE.

WILLIAM E. PUFFER, OF BROOKLYN, NEW YORK.

AUTOMATIC REGULATOR FOR FURNACES.

SPECIFICATION forming part of Letters Patent No. 265,633, dated October 10, 1882.

Application filed February 18, 1882. (No model.)

T all whom it may concern:

Be it known that I, WM. E. PUFFER, of Brooklyn, in the county of Kings and State of New York, have invented certain new and useful Improvements in Automatic Regulators for Furnaces and Dampers for the same, which improvements are fully set forth and described in the following specification and the accompanying drawings, forming a part thereof.

My invention relates to automatic regulators and dampers for furnaces, which consist of expanding and contracting parts, in connection with other parts non-expanding, or comparatively so, placed in such relation to a furnace as to be subject to the heat thereof, and by the action of expansion and contraction so operate the regulator that it will open and close a damper.

My invention consists in attaching the expanding parts to the parts to which they connect on a collar, which is then bolted to a head or other part of the regulator, so that the expansible part may be made of much lighter material than is now used when the joint is made by means of a screw, thereby securing greater sensitiveness in the expanding part to the changing heat of the furnace, providing the counter-weight on the arm of the regulator with a set-screw, by which it can be fixed at any desired point thereon, perforating the tube or expansible part by a series of holes or slots that the heat may operate both on the interior as well as the exterior, or by substituting for a tube two longitudinal segments of a tube, as hereinafter described, and, lastly, a device for regulating the size of the opening in the damper-valve; also, a series of projections which form a ring on the internal wall of the damper-case and surround the damper-valve when it is closed, all of which is set forth in detail in the drawings, in which all similar letters of reference indicate like parts, and in which—

Figure 1, Sheet 1, is a front view of the dial and index-hand, and the arrows pointing in the direction the hand is to be turned for an increase of heat. Fig. 2 is a vertical side section of a regulator. Fig. 3, Sheet 1, is a front view of my improved joint as used on the rear end of the expansible part of a regulator, the expanding part being shown in section at line $x\ x$ of Fig. 2, and shows two segments of a tube. Fig. 4, Sheet 1, is a side view of a tube perforated with a series of holes that the heat may act on the interior of it as well as the exterior. The view also shows the ends flanged. Fig. 5, Sheet 1, is a longitudinal section of an expansible part, and shows the arrangement of the asbestus coating and non-expanding part or rod in its interior. Fig. 6, Sheet 1, is a cross-section of the same. Fig. 7, Sheet 2, is a bottom view of the damper, and shows the smoke-flue and cold-air dampers. Fig. 8, Sheet 2, is a section of the same, taken at line $v\ v$ of Fig. 7. Fig. 8ª is a bottom view of the damper and sleeve projections on the inside of the smoke-flue. Fig. 9, Sheet 2, is a view of furnace with regulator and damper attached.

In the drawings A, is the dial; $a$, an arrow pointing in the direction the index-hand B is to be turned to cause the regulator to give more heat. $b$ is the arrow on said hand, pointing in the same direction as arrow $a$ and for the same object.

G is a base-piece which gives attachment to all the other parts, and by which the regulator is attached to the furnace, $g$ being a strap for this purpose.

C is an expansible tube, $c\ c$ being flanges on its ends, and $c'\ c'$, Fig. 4, a series of holes which allow the heat to pass into its interior.

C' is another form of the expansible part, and consists of two longitudinal segmental sections of a tube. (See Fig. 3.)

H H are two rings, provided each with two lugs, $h$. Said rings fit on the ends of the tube C or segments C or C', the ends of which are then turned out, so as to form the flanges $c$. One ring is then bolted by bolts which pass through its lugs $h$ to the head I, which is provided with the boss or projection $i$, which enters the interior of the expansible part. The other ring is then bolted in like manner to the base G.

D is the non-expanding part. In Fig. 2, Sheet 1, it is shown without its protecting-coat of asbestus; but, in connection with the other parts of the regulator, in Fig. 5 it is shown inclosed in a tube, D'—say a piece of gas-pipe—which is covered with the coat of asbestus $d\ d\ d\ d$. This tube D' may, however, be dispensed with and the asbestus covering or coat be directly applied to the rod D; or the rod D may be dispensed with and the tube or pipe D' be used; or they may be combined to form and act as the non-expansible part.

E is the movable arm, constructed in the usual form, and pivoted to the base G at $e$, Fig. 2.

The dial-head is provided with a projection on the lower part of its back, by which it is pivoted to the base at $a^2$. It has also the usual hooked projection, F, which takes bearing in the usual way on the arm E. It is also provided with the pendent arm N, which passes down between the point of the regulating screw $b^2$ and the front end of the non-expansible rod D, and is provided with a pointed projection, $o$, on its rear face, which forms the bearing for the end of the rod D.

S is the counter-weight on arm E, and is provided with the set-screw M, by which the weight can be fixed at the proper place on the arm E, and is thereby protected from any accidental displacement and consequent disarrangement of the regulator.

$m$, Fig. 2, is a set-screw, which acts for the proper adjustment of the rod D to the length of the expansible part and its bearing on pendent arm N.

The damper-case is shown by P and P', P being the flue part and P' the air part.

$p$ $p$ is the shaft to which the valves are attached, and is journaled in copper bearings. That portion of it which would cross the central part of the smoke-flue valve U is removed, so as not to cover the hole in this valve, which is provided, as usual, for the escape of gas when the valve is closed. In connection with this opening T in the valve I place on the under side of the valve an elongated cover, $t$, and connect it to the valve U by a pivot, $u$, so that the cover $t$ can be made to cover more or less of the opening T, as may be required in adjusting the regulator to the furnace. For the purpose of adjustment of this cover $t$, I provide it with the projecting stud $t^2$ at the end opposite to its pivot by passing a small hooked rod through a hole in the damper-case, and thereby moving the cover as desired.

V V are a series of projections on the interior of case P at the seat of the valve, so as to surround it. They are, however, made short, so as not to come in contact with it. By this arrangement the valve is less liable to accumulate soot or ashes or to stick.

Operation: When the tube C or sections C' expand by reason of the heat of the furnace it allows the lever E, with weight S, to gradually lower, and, acting through connecting-rods, acts on the damper U so as to turn it on its axis and close the flue P, thereby checking the combustion of the fuel. When the furnace cools the tube C or the sections C' C' contract and raise the lever E and weight S, thereby allowing the damper-weight to open the damper-valve U. The regulator is set to operate at any desired degree of heat by turning the adjusting-pointer B and screw to a higher or lower figure, it being understood that the higher the figure the greater will be the heat required to expand the expanding parts so as to close the damper, and the lower the figure the reverse.

Having thus described my invention, what I claim, and desire Letters Patent for, is—

1. In a furnace-regulator, the expansible parts C or C', connected to the base-piece G and head I by rings provided with lugs, in combination with flanges turned up on the ends of said expansible parts, substantially as and for the object set forth.

2. In an automatic damper-regulator, the combination of the base G, lever A, lever E, regulating-screw P', expansible tube C, and non-expansible rod D with asbestus covering $d$, substantially as and for the purpose set forth.

3. In a furnace-damper, a damper-case provided with a series of projections which surround the valve when closed, substantially as and for the object specified.

WILLIAM E. PUFFER.

Witnesses:
 WM. M. CUTHBERT,
 O. N. PAYNE.